Jan. 9, 1923.
J. R. ELLIS.
REFRIGERATED CONTAINER.
FILED NOV. 15, 1921.
1,441,672.
2 SHEETS—SHEET 1.
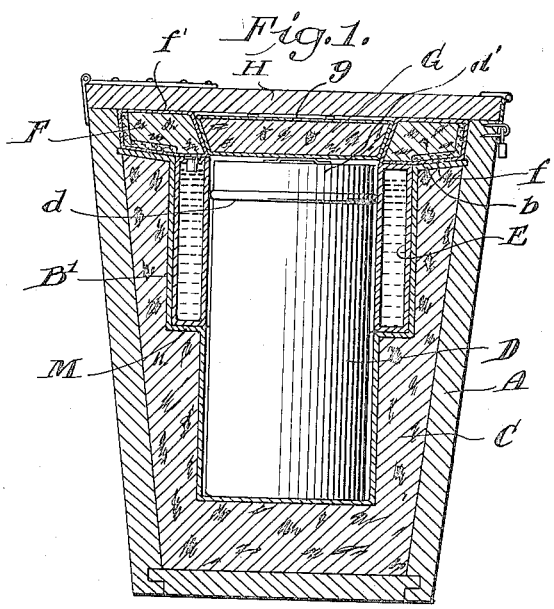
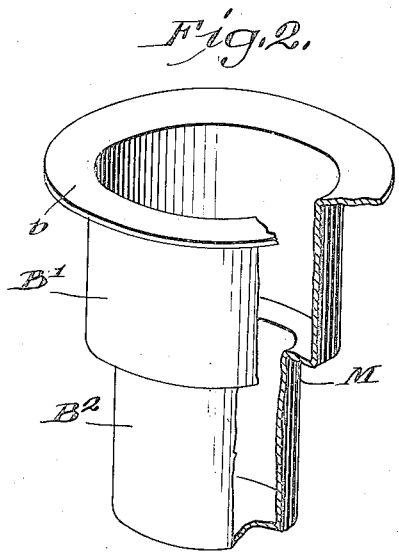
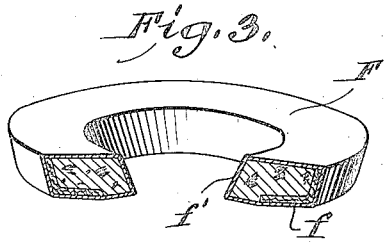
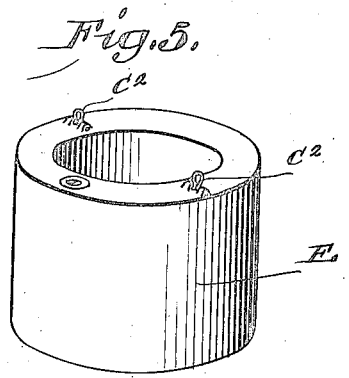
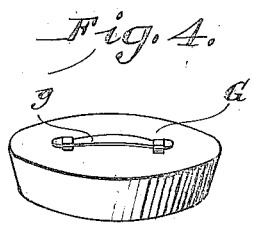
Inventor
James R. Ellis
By
Attorney Jan. 9, 1923.                                                              1,441,672.
J. R. ELLIS.
REFRIGERATED CONTAINER.
FILED NOV. 15, 1921.                                    2 SHEETS—SHEET 2.
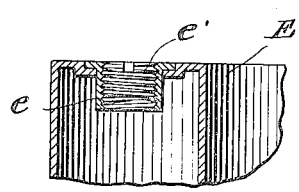
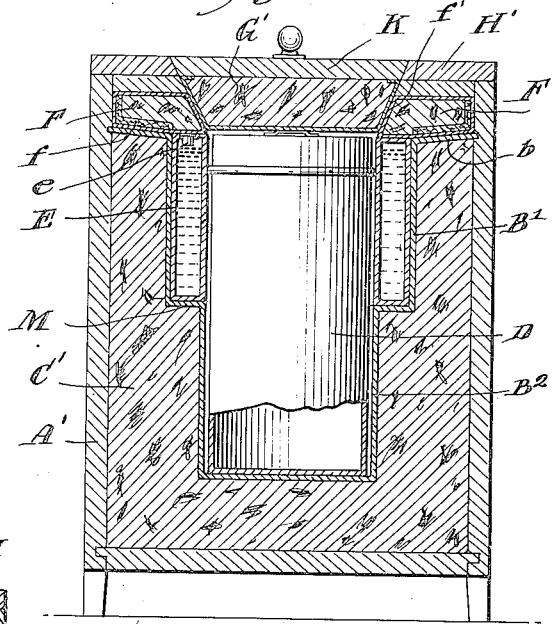
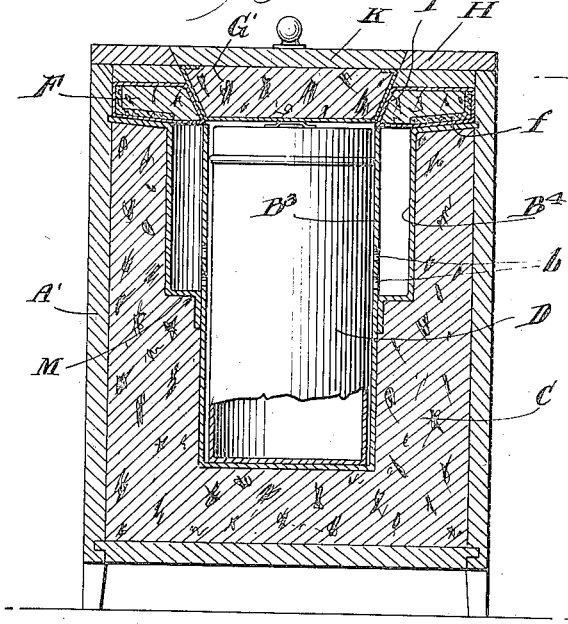
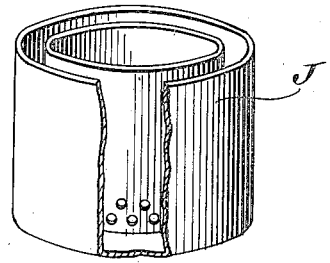
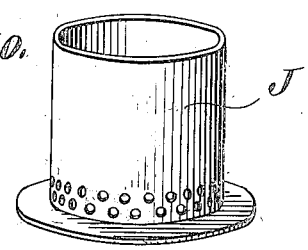
Inventor
James R. Ellis
By
Horsey Hole
Attorney Patented Jan. 9, 1923.

1,441,672

UNITED STATES PATENT OFFICE.

JAMES R. ELLIS, OF CHEVY CHASE, DISTRICT OF COLUMBIA.

REFRIGERATED CONTAINER.

Application filed November 15, 1921. Serial No. 515,205.

*To all whom it may concern:*

Be it known that I, JAMES R. ELLIS, a citizen of the United States of America, and a resident of Chevy Chase Drive, Chevy Chase, District of Columbia, have invented certain new and useful Improvements in Refrigerated Containers, of which the following is a specification.

This application is filed as a continuation in part of my prior application Serial No. 432,962, filed December 24, 1920.

The invention here disclosed has for its object to provide a construction lending itself to the transportation and the keeping of materials, specifically ice-cream, requiring the maintenance of a relatively low temperature.

For this purpose it consists of a heat-insulating package enclosing the can containing the article to be held at the low temperature hereinafter specifically referred to as ice-cream, and provided with a space surrounding the upper part of the can for the reception of refrigerating material, it being my discovery that such location of a refrigerating material is most economical and efficient in maintaining the desired temperature in the ice-cream.

The space in question can be occupied by a tight collar containing a refrigerating substance, this being desirable where the container is to be used as a shipping container, or by refrigerating substances in the form of a freezing mixture not enclosed in a tight collar, the latter being especially useful where the container is to be used as a dispensing vessel for the ice-cream.

Obviously, at times the space in question may be occupied by the refrigerating substance in the collar, and again by the freezing mixture, as the use may demand.

The invention further contemplates the construction of the container whereby a maximum heat-insulation is obtained, and whereby convenient usage is provided, as will be hereinafter more fully described and claimed.

Referring to the accompanying drawings, in which corresponding parts are designated by similar marks of reference,—

Figure 1 is a sectional view of a container constructed in accordance with my invention, in a shape which may be used for making shipment.

Figure 2 is a perspective view partly broken away, of the can containing sleeve shown in Figure 1.

Figure 3 is a perspective view of the top packing ring.

Figure 4 is a similar view of the top packing plug.

Figure 5 is a perspective view of a collar such as shown in Figure 1, for containing the refrigerating substance.

Figure 6 is an enlarged sectional view through the upper part of the collar.

Figure 7 illustrates the application of this invention to a stand, such as is commonly used not for shipping ice-cream, but for maintaining the same chilled while dispensing.

Figure 8 represents a modification of the form of the invention shown in Figure 7, in which, in lieu of having the refrigerant in the collar shown in Figure 1, the refrigerating substance is a freezing mixture contained within the annular space in the sleeve surrounding the upper part of the can.

Figure 9 is a detail of an open collar, adapted to replace in Figures 1 and 7, the closed collar, and to thereby obtain a result similar to that obtained with the construction shown in Figure 8.

Figure 10 is a view similar to Figure 9, of a modified form of the collar shown in Figure 9.

Referring to the form of the invention shown in Figures 1 to 6, the container is shown in the form of a tub A, within which is contained the vertical sleeve, preferably of metal, consisting of upper and lower cylindrical portions $B^1$ and $B^2$, respectively, the former being of the greater diameter. The top edge of the sleeve is somewhat below the top edge of the tub and is flanged over as at $b$, to make a water-tight connection with the inner wall of the tub, the bottom of the sleeve, which is closed, being somewhat above the bottom of the tub. A suitable packing C of insulating material, such for instance as ground and formed cork, is interposed between the sleeve and sides and bottom of the tub. The diameter of the lower section of the sleeve is such as to conveniently receive the ice-cream can D.

Located within the upper section $B^1$ of the sleeve is a hollow annular collar E, also preferably of metal, whose inner diameter is such that the bead $d$, common on ice-cream cans, fits snugly therein.

The upper edge $b'$ of the sleeve, slopes slightly towards the center, to permit any moisture which may gather thereon to drain towards the sleeve, and supports an annulus F of heat-insulating material, preferably cork, etc., covered with water-proof canvas, or fabrikoid. The lower and outer surfaces of the annulus have beneath the fabrikoid, a layer of water-proof felt $f$, which serves not only to make an air-tight joint against the sides of the tub, but also by friction to hold the annulus against displacement. The diametrical thickness of this annulus at the bottom, is such that it covers, or substantially covers, not only the flange $b$, on the sleeve, but also the top of the space formed around the can by the enlargement B' of the sleeve.

The inner wall $f'$ of the annulus is somewhat chamfered to receive the packing disk, or plug G, which is above the top $d'$ of the can. This plug may be made of suitable insulating material covered with water-proof canvas or fabrikoid and provided with a lift handle $g$.

The tub may be closed by a suitable lid H, secured as desired.

The collar E in use, will contain a suitable refrigerating substance, for instance, a refrigerated or frozen solution of brine. It is provided in its top with the downwardly and inwardly projecting nipple $e$, threaded for the reception of the stopper $e'$. By removing the stopper, the collar may be partly filled with the desired liquid. The downward projection of the nipple prevents, under normal conditions, the collar being entirely filled, as it will serve to trap air immediately beneath the top of the collar. This is of importance in giving an air space which will prevent bursting of the collar on the freezing of its contents. The collar is also provided with drop handles $c^2$.

It will be noted that the upper part of the containing can D, is surrounded by the collar containing the refrigerated substance, and that the bead $d$, serves to prevent the admission of warm air down around the can when the lid H is lifted and the packing disk or plug removed in the serving of the contents of the can. This has been found desirable, as the construction shown has for its object to permit the dispensing of the can's contents from time to time, as well as the shipment of the ice-cream.

I have thus provided a construction, by which the ice-cream may be shipped and maintained in good condition during shipment, without necessitating the salt ice packs now commonly in use, and in which the cream may be subsequently dispensed from the shipped package while being maintained in good condition.

My invention, however, is not restricted to the feature of shipping the cream, but is of value purely as a means of keeping cream while being dispensed, and Figure 7 illustrates a cross section through what is technically known as an "ice-cream stand," constructed in accordance with this invention. In this figure, the container A' may be of the usual rectangular construction, enclosing the insulating packing C', and the parts previously discussed, except that the top is not hinged as in Figure 1, but may be a lift-off top H', as shown, having in it one or more holes located vertically over the cans in which are fitted lids K. In this construction, the packing disk or plug G' may be formed directly upon the under surface of the lid. With this construction, it will be noticed that re-packing merely requires the removal of the refrigerated collar E when the same is exhausted, and its replacement by a new collar having heat-absorbing power.

My invention, however, is not restricted to containing the refrigerating material in a water-tight collar surrounding the upper part of a can, and in Figure 8 I have shown an embodiment of my invention in an ice-cream stand in which the construction is generally that before described, except that the lower restricted portion of the sleeve is brought up within the enlarged portion thereof and is perforated as at $b^2$. The space left between the walls $B^3$ and $B^4$ may be packed with a refrigerating mixture, (salt and ice), from time to time, which will act as the refrigerating material for the stand, the water resulting from the melting of the ice flowing down into the bottom of the sleeve, and serving to chill the latter and the ice-cream contained therein, this being desirable when my invention is used for dispensing purposes, as when the ice-cream within the can is used down to below the bottom of the sleeve E, shown in Figure 1, there is lacking sufficient heat-conducting material between such ice-cream and the refrigerated collar to maintain the ice-cream in the desired condition. In the construction just suggested, the brine water acts as such a medium, both by conduction and convection, and the smaller portion of the sleeve should be of sufficient diameter relative to the can to permit this.

In Figures 9 and 10, I have illustrated devices by which the form of the invention shown in Figure 7 can be adapted for use with loose salt and ice, as is represented in Figure 8. Each of these consists of a collar J, but open at the top, and having perforations in its inner wall. It is obvious that such a collar filled with loose ice and salt may be used to replace the collars E shown in Figures 1 and 7, whenever in the dispensing of the ice-cream it is found advisable to do so.

The collar of Figure 9 is similar in shape to the collar E, but is open at the top, while the collar of Figure 10 is open at the top and has no outer wall.

Moreover, in dispensing the cream, when difficulty is found in keeping the cream at the bottom of the can hard in the type of the invention shown in Figures 1 and 7, due to the fact that the ice-cream has been used down below the collar, it may be found advantageous to place a brine within the sleeve, and around the can. Such brine acts as a conducting and convecting medium for exchange of temperature between the ice-cream in the bottom of the can, and the collar in the top of the can.

It will be obvious that the heat-insulating packing C may be suitably formed in molds to fit a tub shown in Figure 1, or a stand such as shown in Figures 7 and 8. In the latter case, it may be made up in the form of a rectangular unit having a central cavity, and a plurality of such units may be placed side by side in a suitable stand A' to provide capacity for the number of cans desired.

In all forms of my invention, it will be noticed that the sleeve is provided with means specifically here shown in the form of a shelf M, adapted to support the refrigerating substance around the upper half of the can.

Having thus described my invention, what I claim is:—

1. In a device of the character described, the combination with a heat-insulating jacket having a central cavity for the reception of a can, of a collar containing a refrigerating substance surrounding the upper part of such cavity, and suitable means for closing the top of such cavity.

2. In a device of the character described, the combination of a heat-insulating container having a central cavity, of a removable collar located within such container and surrounding the upper portion of such cavity, a packing annulus located above such collar, and a packing disk removably contained within the annulus and closing the upper part of the cavity.

3. In a device of the character described, the combination with a heat-insulating container having a central cavity, a can removably contained within the cavity, and having a bead upon the upper end thereof, a collar contained within the heat-insulating container, and surrounding the upper part of the can and making a snug fit with the bead thereon, a packing annulus located above the collar, and a packing disk removably contained within the packing annulus.

4. In a device of the character described, the combination with a heat-insulating container having a central cavity, a can removably contained within the cavity, and having a bead upon the upper end thereof, a collar contained within the heat-insulating container, and surrounding the upper part of the can and making a snug fit with the bead thereon, a packing annulus located above the collar, a packing disk removably contained within the packing annulus, and means for removably holding the packing annulus in place.

5. In a refrigerator container, the combination of a vessel having outer walls, a heat-insulating lining and a removable water-tight annular element adapted to contain the refrigerant, both contained within the vessel, and a cover for the said vessel.

6. In a refrigerating container, the combination of a vessel having outer walls, a heat insulating lining and a removable water-tight annular element adapted to contain the refrigerant, both contained within the vessel, a removable annular insulating element above the annular container, and a cover for the said vessel and other elements.

7. In a device of the character specified, the combination of a can, a water tight sleeve whose lower end is adapted to receive the can and whose upper end is enlarged to afford a refrigerant containing space around the upper end of the can, and insulating packing for the sleeve and contents of the can.

8. In a device of the character specified, the combination of a can, a sleeve whose lower end is adapted to receive the can, said sleeve having a refrigerant-supporting shelf surrounding the can intermediate its ends.

9. In a device of the character specified, the combination of a can, a sleeve whose lower end is adapted to receive the can, said sleeve having means for supporting a refrigerant around the upper part of the can, the end of the sleeve in which the can is received below the refrigerant being of such diameter as to permit of convection currents therein around the can.

10. In a device of the character specified, the combination of a can, a sleeve adapted to receive the can, said sleeve having a refrigerant-supporting means surrounding the can intermediate its ends, the end of the sleeve in which the can is received below the refrigerant, being of such diameter as to permit of convection currents therein around the can, and insulating packing for the sleeve and contents of the can.

11. In a device of the character specified, the combination of a can, a sleeve adapted to receive the can, means carried by the sleeve for supporting a refrigerant around the upper end of the can, said sleeve communicating with the refrigerant-supporting means for allowing convection currents around the lower end of the can.

In testimony I hereunto affix my signature.

JAMES R. ELLIS.

DISCLAIMER.

1,441,672.—*James R. Ellis*, Chevy Chase, D. C. REFRIGERATED CONTAINER. Patent dated January 9, 1923. Disclaimer filed October 28, 1928, by the assignee, *The Liquid Carbonic Corporation.*

Hereby disclaims the combination of elements recited in claim 1 of said Letters Patent except when used for the storing of ice cream, or the like, in the "can" and the dispensing of the same therefrom, to effect the maintaining of the ice cream in frozen condition and of more nearly uniform hardness throughout the body thereof than in the case of those refrigerating structures wherein the refrigerant surrounds the bottom of the can; and further disclaims the combinations of elements recited in claims 1, 7, 8, 9 and 10 except in a structure wherein the bottom of the refrigerant container is positioned a substantial distance above the bottom of the can and when the "refrigerant" used is, as described in the specification, of a character commonly used for the preservation of ice cream and of a temperature below that at which the mixed ingredients comprising ice cream, or the like, congeal.

[*Official Gazette November 27, 1928.*]